Patented June 27, 1950

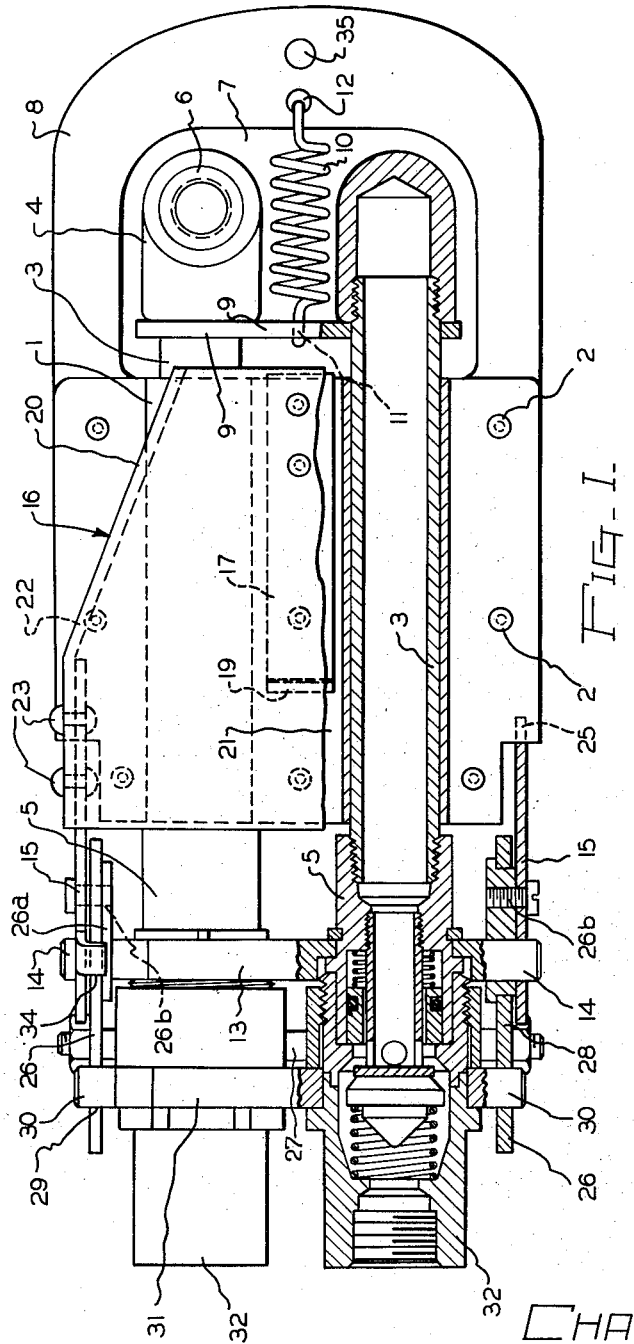

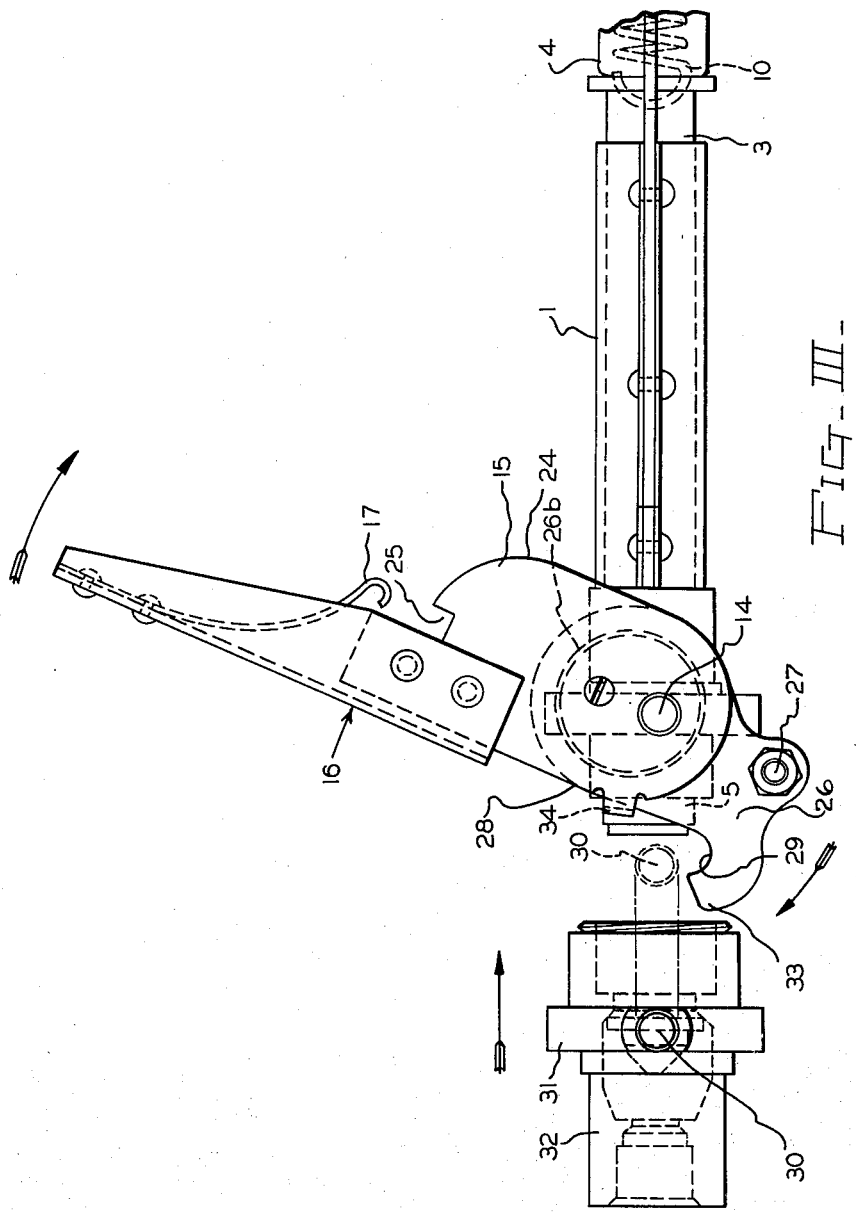

2,512,939

UNITED STATES PATENT OFFICE 2,512,939

BREAKAWAY COUPLING

Charles Hollerith, Jackson, Mich., assignor to Aeroquip Corporation, Jackson, Mich., a corporation of Michigan Application September 24, 1947, Serial No. 775,805

4 Claims. (Cl. 284—18)

1

This invention relates to break-away couplings of the type employed to couple together the opposed hollow body parts of a fluid coupling, or a plurality thereof, while providing, however, for the automatic separation of the coupling parts, and hence the fluid pipe lines associated therewith, upon one of the pipe lines being subjected to a predetermined or excessive external force or strain applied in the direction of the longitudinal axis of the fluid coupling, whereby a safety factor is provided which avoids damage to the coupling means and particularly to the hose lines associated therewith. Such a safety factor is required, for instance, on a tractor and trailer employing hose lines connected between the tractor and trailer (which may be a farm implement) by coupling means capable of breaking-apart automatically to release the coupled halves of the fluid coupling means upon an excessive strain or force being set-up between the tractor and trailer, due, for instance, to the latter meeting an unsurmountable obstruction in the travel of the tractor over the ground.

In particular the invention is applicable to fluid couplings of the self-sealing type as disclosed in U. S. Patents Nos. 2,208,286 and 2,391,022, and which employ self-sealing valves for automatically closing the ends of the coupling halves against loss of fluid when the same are uncoupled.

The invention has for its object to provide an automatic break-away coupling of the above type in which the break-away condition is obtainable without changing the effective length of the fluid passageway opened up between the coupled fluid coupling parts and with the maintaining of a constant fluid volume within the latter and their associated fluid pipe lines or hoses.

The invention also has for its object to provide a break-away coupling of the above type with a lever and cam action to effect the desired break-away condition and with which the coupled condition can be readily and positively made whenever required.

The invention also has for its object to provide a break-away coupling of the above type which is of robust construction and is able to stand-up to the heavy wear imposed thereon, as when employed on farm tractors and trailers.

These and other objects of the invention will appear apparent from a consideration of the following description with reference to the accompanying drawings in which:

Figure I is a plan view with the top half in elevation and the bottom half in longitudinal

2 section, of one embodiment of the invention with the parts shown in the coupled condition;

Figure II is a side elevation of Figure I, and

Figure III is a similar view to Figure II but showing the parts in the uncoupled condition, and ready for a fresh coupling connection.

In carrying the invention into effect in one convenient manner as illustrated in the drawings an automatic break-away coupling is provided comprising an elongated casing having a rectangular hollow part 1 flattened and closed along its opposite longitudinal edges by the rivets 2 and open at its opposite ends for the passage therethrough of the rigid fluid conductor tubes 3, of which a pair are shown in parallel relationship extending lengthwise of the hollow casing part and slidable with respect thereto to a limited extent as determined by the pipe nipple unions 4 at one end and the fluid coupling halves 5 at the opposite end.

The unions 4 are of elbow form and serve for the attachment of the flexible hoses at 6 by the customary connecting means and these unions are slidable within an open space 7 formed in the end extension 8 of the hollow casing and are united within such space by a transverse yoke 9 secured upon the corresponding ends of the tubes 3.

A coil spring 10 connects the yoke 9 at 11 with the opposite end of the casing extension 8, the spring being shown anchored to the latter at 12.

The fluid coupling halves 5 are in the form of tubular sockets and are united by a transverse yoke 13, the opposite ends of which are formed to provide trunnions 14 for the pivotal mounting thereon of the side plates 15 of a lever assembly 16 which is capable of being swung about the trunnions 14 towards or away from one face of the said casing and is normally spring biassed away from such face by a spring 17 secured at 18 to the lever and bearing at its free end 19 upon the casing. The lever assembly is formed by the triangulated plate 20 which is disposed to overlie the one face 21 of the casing and is shown as having depending side flanges 22 at one end of which, corresponding to the pivoted end of the lever, the side plates 15 are fixed by the rivets 23 so that the lever plates 20 and 15 move as one about the trunnions 14.

These side plates 15, on their vertical edges adjacent the free end of the free end of the lever assembly, are each formed with a cam edge surface 24 leading into a recess 25 which is aligned with the corresponding end of the flattened side of the casing 1 when the lever assembly is swung down into the position shown in Figure II, whereby in this position the corresponding flattened end portion of the casing is free to enter into engagement with its respective recess 25, under the influence of the spring 10, and in doing so partakes of longitudinal motion relatively to the lever assembly to an extent limited by the longitudinal extent of the recesses 25.

Mounted also upon the trunnions 14 and adjacent to the inner surface of each said side plate 15 of the lever assembly there is a lever member 26 so that there are a pair of these lever members disposed in parallel relationship and united together for pivotal movement about the trunnions 14 as a unit by the transversely extending connecting rod or bar 27. Each lever member 26, however, is mounted for rotational movement about an eccentric disc 26a itself mounted upon the corresponding trunnion 14 and connected also to the corresponding side plate 15 by the screwed stud 26b which is screwed through this plate and into the eccentric disc.

Each said lever 26 is formed in its upper edge portion 28 with a depression 29 shaped to receive the corresponding trunnion 30 of a transverse yoke 31 which carries in parallel relationship thereon, the tubular body parts 32 forming the other halves of the fluid coupling, whereby two opposed pairs of fluid couplings are provided and the break-away coupling is, therefore, common to the two pairs of fluid pipe or hose lines thereby constituted.

The lever members 26 are capable of an eccentric swinging movement independently of the swinging movement of the lever assembly and relatively to the side plates 15 of this assembly and the arrangement is such that the united levers 26 can be adjusted into a position where, as shown in Figure III, their depressions 29 can function to form a cradle to receive the trunnions 30, and, thereby support the coupling halves 32 for axial sliding movement with respect to the other coupling halves 5 during the time that the two coupling halves are being coupled together and the pressure of their valve operating springs is being overcome in order to open these valves in the final coupled condition, such opening of the valves against their spring pressures and against the fluid pressure normally existing in the associated fluid pipe (or hose) lines being capable of being effected by the mechanical leverage, or rather with the mechanical advantage, afforded by the engagement of the upstanding fingers 33 of the levers 26 and the attendant eccentric motion.

The side plates 15 on their upper edges are conveniently formed with inwardly turned lips 34 which engage with the upper edges of their respective levers 26 and serve when the lever assembly is moved into its raised position, by the action of the spring 17, to exert pressure upon these lever members 26 in order to swing them downwardly about their trunnions 14 and relatively to the side plates 15 of the lever assembly, whereby in this manner the cradle provided by the levers 26 is removed from operative engagement with the coupling halves 32 and the latter are free to break apart from their associated coupling halves 5 under the opposing spring pressures within the couplings and against the fluid pressure also normally prevailing therein.

With the parts in the position shown in the drawings and with the casing 1 fixed to a supporting structure, such as a tractor, by the engagement of a key pin (not shown) in the eye 35 of the casing extension 8, upon an external force being applied to the coupling parts 32 to pull the latter to the left away from casing 1 relative motion will occur at the recesses 25 against the action of the spring 10 but with the coupling halves still coupled together and movable as one in the direction of the pulling force. If, however, the latter reaches such a value as causes the recesses 25 to be removed completely from the ends of the flattened sides of the casing 1 the lever 16 will be immediately released to spring upwards by the pressure of its spring 17 and will thus provide an automatic breakaway condition in which the fluid coupling halves 5 and 32 are freed for axial separation, since the mechanical coupling is then no longer effective and the fluid coupling halves are free to move apart from each other.

Having thus described one practical form of the invention, the actual details of construction of which can be modified to suit particular requirements or practical considerations, what I claim is:

1. In a fluid coupling having the ability to permit the coupling connection to be automatically broken upon the occurrence of a predetermined external pulling strain exerted upon the coupled parts in the direction of the longitudinal axis thereof, a main casing part, a fluid conductor slidably mounted upon said casing part, the latter being adapted for attachment to a relatively fixed supporting structure for the coupling, resilient means normally urging said fluid conductor into a retracted position with respect to said casing part, a catch lever pivotally carried by said conductor and engageable with said casing to hold the two together while permitting the conductor and casing to move apart automatically against the action of said resilient means when subjected to the said predetermined external pulling strain, spring means on the lever and engageable with said casing to swing the lever outwardly away from the casing when the lever is released, and a catch plate carried by said lever and engageable with the casing to hold the lever and casing locked together with said spring on the lever in a state of tension, said catch plate being recessed for engagement with the casing when the recess is brought opposite the casing upon inward swinging movement of said lever, whereupon the casing and catch plate move towards one another to an extent limited by the recess and under the influence of said first mentioned resilient means, the said catch plate being capable of being subjected to the influence of said external pulling strain to pull the recessed part of the plate away from the casing whereby to free the lever from the casing and permit the automatic uncoupling action to take place.

2. In a fluid coupling as claimed in claim 1, carrier means on said catch plate, said carrier means being adapted to support a complementary fluid conductor for movement into and out of coupling relation with said first mentioned fluid conductor, and means mounting said carrier means for movement with said catch plate in such manner as constrains said complementary fluid conductor to be urged rectilinearly towards said first fluid conductor in the casing engaging movement of said catch plate.

3. In a fluid coupling as claimed in claim 1, carrier means pivotally and eccentrically mounted on said catch plate, said carrier means being adapted to support a complementary fluid conductor for movement into and out of coupling relation with said first mentioned fluid conductor, and said eccentric mounting of the said carrier means being such as constrains said complementary fluid conductor to be urged rectilinearly towards said first fluid conductor in the casing engaging movement of said catch plate.

4. In a fluid coupling as claimed in claim 1, carrier means pivotally and eccentrically mounted on said catch plate, said carrier means having an open hook recess in which a complementary fluid conductor is adapted to be received and supported upon the carrier means for movement into and out of coupling relation with respect to said first mentioned fluid conductor and said eccentric mounting of the said carrier means being such as constrains said complementary fluid conductor to be urged rectilinearly towards said first fluid conductor in the casing engaging movement of said catch plate.

CHARLES HOLLERITH.

REFERENCES CITED

The following references are of record in the file of this patent:

UNITED STATES PATENTS

| Number | Name | Date |
|---|---|---|
| 442,621 | Harris | Dec. 16, 1890 |
| 813,637 | Frenzel | Feb. 27, 1906 |
| 2,425,500 | Wiggins | Aug. 12, 1947 |
| 2,441,363 | Krueger | May 11, 1948 |